Patented Nov. 3, 1925.

1,560,420

UNITED STATES PATENT OFFICE.

FRANK E. GREENWOOD, OF NEW ROCHELLE, NEW YORK, ASSIGNOR TO PINE WASTE PRODUCTS, INC., OF NEW YORK, N. Y., A CORPORATION OF DELAWARE.

PRODUCTION OF RESIN.

No Drawing. Application filed August 25, 1920. Serial No. 405,921.

*To all whom it may concern:*

Be it known that I, FRANK E. GREENWOOD, a citizen of the United States, and a resident of New Rochelle, county of Westchester, and State of New York, have invented certain new and useful Improvements in Production of Resin, of which the following is a specification.

This invention relates to the recovery of resin from the so-called "black liquor" of pulp mills.

In the pulp mill, the wood chips which form the basis of the pulp are acted on by an alkaline liquor which attacks the non-cellulose constituents and produces cellulose in the fibrous condition of pulp. The fresh alkaline liquor which is used in this so-called "cooking" operation is known as the "white liquor," and the spent liquors of digestion which are drained from the pulp are known as the "black liquor." This black liquor contains the chemicals of the white liquor combined with and carrying the non-cellulose constituents of the wood, including such resins as were not previously removed by extraction or other processes.

These resins are present in the form of an emulsion of unsaponifiable resins and the saponified resins and this emulsion floats on the surface of the liquor as a foam and is known in the art as "crude rosin soap." This crude rosin soap is usually removed from the black liquor to facilitate the recovery of the active chemicals for re-use in subsequent pulping operations. In other words, the crude rosin soap is a troublesome by-product which it is desirable to dispose of before the useful chemicals are recovered from the black liquor.

Heretofore, this crude rosin soap after separation from the black liquor has been allowed to go to waste, and at best has been simply used for fuel purposes.

The objects of my invention are to recover the resins from the crude rosin soap referred to, thus utilizing the black liquor as a source of commercial resins and to accomplish the recovery of the resin in an economical and commercially practical way.

The crude rosin soap is usually removed from the black liquor by a so-called "soap separator" and is usually in the form of a black sticky emulsified mass composed of sodium or other alkali salts of various resin acids and other organic acids carrying other organic substances that are not acids. This soapy mass also contains a large amount of water, carrying various salts in solution. Upon treatment of the soapy mass with any mineral acid or with acetic acid, the organic acids referred to are set free, at first as a flocculent precipitate which on the addition of more acid coheres into a gummy mass, containing the acids and the non-acid organic matter together with a large amount of water. One of the resin acids present is abietic acid; a body which forms the main component of ordinary rosin. The recovery of the resin from the black liquor according to my invention, involves the separation of this abietic acid from the other organic acids as well as inorganic matter associated with it in the rosin soap.

One of the steps in the practice of my invention may be a preliminary act of purifying the low grade or crude rosin soap by a known process, involving dissolving the soap in hot water and fresh alkali. The pulp mill white liquor furnishes a readily available source of alkali and I usually employ it for this purpose.

The solution is allowed to cool and as it cools the sodium or other alkali salts of the abietic acid, sodium abietate, for instance, which is less soluble in a cold concentrated alkali liquor, settles to the bottom. The supernatant liquor retains a large part of the unsaponifiable matter as well as the alkali salts of all those organic acids which are more soluble in it than is alkali abietate. This liquor is drained away, leaving the soap partially purified. The separating operation described may be repeated as many times as found desirable or economical, the amount of impurities removed decreasing materially with each successive separation. The product of this treatment or series of treatments may be considered, and will be herein referred to as, "purified rosin soap."

If desired the separating operations just described may be eliminated and the rosin soap be treated in its first or crude form. The separation treatment therefore, while in some cases desirable, is not a feature of this invention.

The crude, or the purified rosin soap, as the case may be, is intimately mixed, for instance, by shaking or other agitation, with a solvent which is immiscible with water and which does not dissolve the moist soap but simply forms an emulsion therewith, thereby bringing the solvent into intimate contact with the soap. I have found light petroleum fractions such as petroleum, ether gasoline or naphtha to be suitable solvents for this purpose. These are chosen because of their property of selectively dissolving the resinous material from the non-resinous organic matter.

To this emulsion, there is added a mineral acid, sulphuric acid for instance. This mineral acid liberates the abietic acid in the emulsion and the abietic acid is absorbed by the solvent, which operates very effectively by reason of its emulsification or intimate mixture with the soap.

A separation is next effected by subjecting the mixture to a moderate degree of heat which causes the solvent containing the abietic acid to float to the top with a cake or organic matter below, and a layer of water containing mineral matters and alkali salts below that. The solvent thus operates selectively upon the matter liberated by the mineral acid. To avoid loss of the solvent, the heating may be carried on with apparatus provided with a reflux condenser.

After cooling, the solvent layer is separated and mixed, as by shaking, with a second solvent which is immiscible with the first, and in which the abietic acid is readily soluble. I have found that denatured or wood alcohol may be used as the second solvent. The main requisite for this solvent is that it shall be immiscible with the first solvent. It should also have the property of selectively depositing the abietic acid in crystalline form. The two liquids in the mixture are next separated and for this purpose it is usually sufficient to let the double solvent mixture stand until gravity separation takes place. In the example given, the gasoline solution floats to the top leaving the alcohol layer beneath. These relations might be reversed with other solvents.

Complete separation of the two solvents is effected, for instance by draining off the upper layer and this, the first solvent, is then mixed, as by shaking, with a fresh portion of the second solvent.

Gravitational or other separation of the two solvents is again effected and mixing of the first with fresh portions of the second solvent repeated until a point is reached where fresh additions of the second solvent remove very little or none of the resinous material from the first solvent. This will be shown by the color of the last fraction of the second solvent.

The solution in the second solvent is concentrated by distilling the solvent, the residue being a syrupy mass which upon standing deposits crystals having the characteristics of abietic acid. If this concentration is carried to the point of driving off all the solvent, the residue will be practically pure rosin. If on the other hand, the concentration is only carried to the point of crystallization, the crystals produced may be still further purified by draining away the mother liquor and making one or more recrystallizations.

Upon fusing the final purified crystals, there is obtained a pure, almost colorless hard brittle rosin of good commercial quality.

Upon similarly distilling the solution in the first solvent (after its extraction by the second solvent) a resinous residue is likewise obtained; and this residue also contains some high grade rosin. It is, however, not so high in grade as the material obtained from the second solvent.

It will be apparent from the foregoing that the first solution is used in the extraction of the abietic acid or rosin from the rosin soap, and that the second solvent then serves to remove the rosin from the first solvent, leaving behind other organic acids and other foreign materials. The first solution is then distilled or otherwise treated to recover the solvent and a residue and the second solution is distilled to recover the second solvent and high grade pale rosin.

The relation of the two solvents may be better appreciated when it is considered that the first solvent dissolves more than pure rosin, and that the second solvent then exerts a selective action removing the pure rosin and leaving the impure in solution with the first solvent. The repeated separations and mixing of fresh portions of the second solvent with the first solvent, may remove practically all of the desirable rosin content from the first solvent. The alcohol or second solvent, in other words, separates out the better grade of rosin. This plural-solvent process results in the production of a good commercial rosin from a readily available and plentiful source,—the pulp mill black liquor.

What I claim is:

1. The herein disclosed process of extracting rosin from pulp mill black liquor which comprises treating resinous components of the black liquor with a solvent, adding an acid which will liberate resinous elements and enable combination of the same with the solvent, and then separating out the rosin content obtained by said solvent by means of a second solvent immiscible with the first and enabling selective separation of the rosin therefrom.

2. The herein disclosed process of extracting rosin from a resinous material of the type of that recovered from pulp mill black liquor which comprises treating said material with a solvent for the rosin and then treating said rosin-bearing solvent with a second rosin solvent which is immiscible with the first, and enabling selective separation of the rosin therefrom.

3. The herein disclosed process of extracting rosin from a resinous material of the type of that recovered from pulp mill black liquor which comprises treating said material with a solvent for the rosin and then treating said rosin-bearing solvent with a second rosin solvent which is immiscible with the first and which is of different specific gravity from the first solvent and enabling selective separation of the rosin therefrom.

4. The herein disclosed process of extracting rosin from a resinous material of the type of that recovered from pulp mill black liquor which comprises treating said material with a solvent consisting of a light petroleum fraction and then treating the resultant solution with an alcohol.

5. The herein disclosed process of extracting rosin from a rosin-bearing material of the type of that recovered from pulp mill black liquor which comprises treating said material with a rosin solvent which is immiscible with water, treating with an acid which will liberate the resinous elements and enable combination of the same with the solvent, treating the resultant solution with a second rosin solvent immiscible with the first and enabling selective separation of the rosin therefrom and finally separating the rosin from the solvent.

6. The herein disclosed process of extracting rosin from a rosin-bearing material of the type of that recovered from pulp mill black liquor which comprises treating said material with a rosin solvent which is immiscible with water, treating with an acid which will liberate the resinous elements and enable combination of the same with the solvent, treating the resultant solution with a second rosin solvent immiscible with the first and enabling selective separation of the rosin therefrom and finally separating the rosin from both solvents.

7. The herein disclosed process of extracting rosin from a rosin-bearing material of the type of that recovered from pulp mill black liquor which comprises treating said material with a rosin solvent which is immiscible with water, treating with an acid which will liberate the resinous elements and enable combination of the same with the solvent, and treating the resultant solution successively with fresh portions of a second solvent immiscible with the first and enabling selective separation of the rosin therefrom.

8. The herein disclosed process of extracting rosin from a rosin-bearing material of the type of that recovered from pulp mill black liquor which comprises treating said material with a rosin solvent which is immiscible with water, acidifying the mixture, separating the resultant solution and then treating the resultant solution with a second rosin solvent which is immiscible with the first and separating the rosin from the solvent.

9. The herein disclosed process of extracting rosin from pulp mill black liquor which comprises removing the rosin soap from said black liquor, treating the rosin soap with a rosin solvent and an acid, said solvent being immiscible with water, separating the resultant solution, and then treating the resultant solution with a second rosin solvent immiscible with the first and enabling selective separation of the rosin therefrom.

10. The herein disclosed process of extracting rosin from pulp mill black liquor which comprises removing the rosin soap from said black liquor, subjecting said soap to a purification treatment, treating the purified rosin soap with a rosin solvent and an acid, said solvent being immiscible with water, separating the resultant solution and then treating the resultant solution with a second rosin solvent immiscible with the first, and enabling selective separation of the rosin therefrom.

11. The herein disclosed process of extracting rosin from pulp mill black liquor which comprises removing the rosin soap from said black liquor, subjecting said soap to a purification treatment, treating the purified rosin soap with a rosin solvent which is immiscible with water, adding an acid which will liberate resinous elements and enable combination of the same with the solvent, separating the resultant solution with a second rosin solvent immiscible with the first and enabling selective separation of the rosin therefrom, and separating the rosin from the solvent.

12. The herein disclosed process of extracting rosin from a rosin bearing material of the type of that recovered from pulp mill black liquor which comprises treating said material with a rosin solvent which is immiscible with water, adding an acid to liberate resinous elements and enable combination of the same with the solvent, separating the resultant solution, treating the resultant solution with a second rosin solvent immiscible with the first and enabling selective separation of the rosin therefrom, separating the two resultant solutions, separating the rosin from the second solution and distilling off the first solvent.

13. The herein disclosed process of extracting rosin from pulp mill black liquor which comprises separating the rosin soap therefrom, treating the rosin soap with a light petroleum fraction and an acid, separating the resultant solution from the balance of the mixture and distilling off the light petroleum fraction.

In witness whereof, I have hereunto set my hand this 23rd day of August, 1920.

FRANK E. GREENWOOD.